Aug. 22, 1933.    S. A. WEST    1,923,466
VEHICLE BODY
Filed May 24, 1929
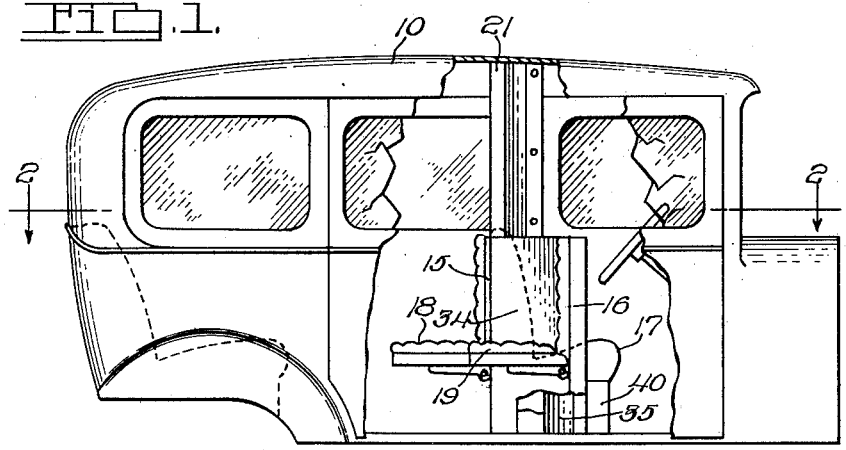
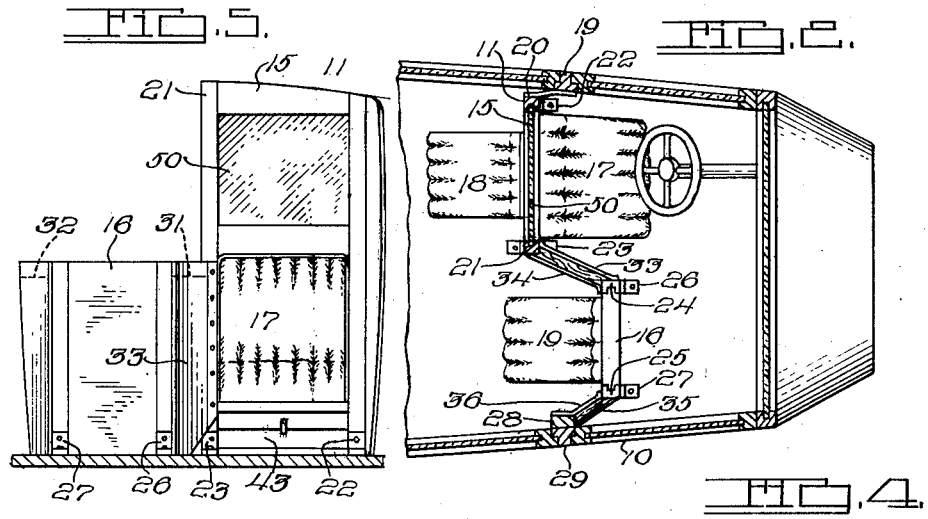
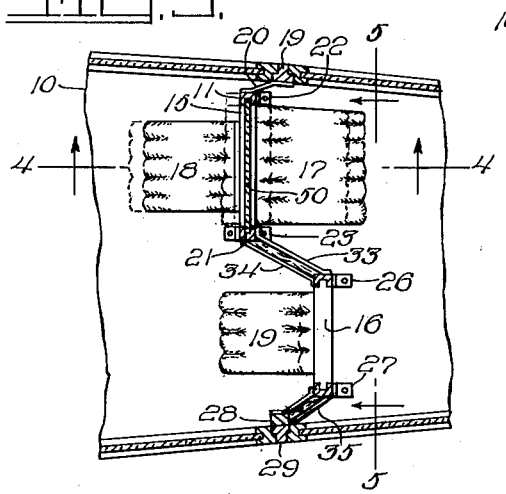
INVENTOR
Starling A. West
BY
ATTORNEYS.

Patented Aug. 22, 1933

1,923,466

UNITED STATES PATENT OFFICE 1,923,466

VEHICLE BODY

Starling A. West, Detroit, Mich., assignor to The Murray Corporation of America, a Corporation of Delaware Application May 24, 1929. Serial No. 365,624

7 Claims. (Cl. 296—63)

An object of my invention is to provide an accessory unit which may be applied to a vehicle body to increase the passenger carrying capacity thereof.

Another object of my invention is to provide a unitary front seat construction in the nature of an accessory which may be applied to closed vehicle bodies for the purpose of converting them into commercial passenger carrying bodies in the nature of taxicabs.

Another object of my invention is to provide a front seat construction for a vehicle body adapted to be applied as an accessory to the standard closed five passenger sedan bodies, for the purpose of converting them from sedans to limousines, and providing a separate operator's compartment.

Another object of my invention is to provide a front seat unit in the nature of an accessory, which may be applied to a standard vehicle body to provide a separate operator's compartment therein, and an adjustable driver's seat as a part of the accessory unit.

Another object of my invention is to provide an accessory unit which may be substituted for the front seat unit of any standard five passenger sedan body which will provide an operator's compartment separate from the passenger compartment, and which will also increase the capacity of the passenger compartment without any alteration or change in the body construction other than the removal of the front seat.

With these and other objects in view, my invention consists in the arrangement, combination and construction of the various parts of my improved device, as described in the specification, claimed in my claims, and shown in the accompanying drawing, in which:

Fig. 1 is a side elevation of a vehicle body having parts broken away, and showing an embodiment of my invention applied thereto.

Fig. 2 is a partial sectional view taken on the line 2—2 of Fig. 1.

Fig. 3 is a horizontal sectional view of a portion of the vehicle body embodying another modification of my invention, the modification residing in the adjustability of the driver's seat.

Fig. 4 is a view taken on the line 4—4 of Fig. 3.

Fig. 5 is a view taken on the line 5—5 of Fig. 3.

The numeral 10 in Fig. 1 designates a conventional sedan body of the five passenger type. The usual two or three passenger front seat has been removed and my unit inserted in place thereof. This unit is shown quite clearly in Figs. 2 and 5. It comprises generally a staggered partition having a rearwardly offset portion 15 and a forwardly offset portion 16. The rearwardly offset portion supports the driver's seat 17 on the forward side thereof and a small folding passenger seat 18 on the rear thereof. This rearwardly offset portion is connected to the left central body pillar 19 by means of a filler panel 20 which is preferably of steel and the edges of which are respectively attached to the pillar 19 and the side edges of the partition 15 by means of nails or screws, or other suitable means, as indicated in Fig. 2. The rearwardly offset portion of the partition preferably extends to the roof of the car and is shaped as shown in Fig. 5, to conform to the contour of the side and roof. The forwardly offset portion preferably extends only about halfway to the roof of the car from the floor, although it may be extended entirely up to the roof. A glass window 50 is preferably secured in the upper portion of the rearwardly offset portion 15 of the partition, and a similar window may be positioned in the upper portion of the forwardly offset portion 16 when that is extended to the roof.

The partition comprises posts or pillars 11 and 21 supporting each side of the rearwardly offset portion 15. These pillars are fastened to the floor of the vehicle by means of angle brackets 22 and 23. The forwardly offset portion is supported by posts 24 and 25 which are secured to the floor of the vehicle by angle brackets 26 and 27. Another post 28 is positioned adjacent the right central body pillar 29 and may be secured thereto by any suitable means such as screws or bolts, not shown. The forwardly offset portion 16 is connected with the rearwardly offset portion 15 by means of a brace member 31 indicated in dotted lines in Fig. 5, which is secured to the upper end of the post 24 and to the intermediate portion of the post 21 by nails or screws or other suitable means (not shown). The post 25 of the forwardly offset portion 16 is secured to the post 28 by means of a cross member 32 indicated in dotted lines in Fig. 5, which extends between the upper portion of the post 25 and the upper end of the post 28, and is secured thereto by nails or screws, or other suitable means. Panels 33 and 34 extend between the post 24 and the post 21, and from the cross member 31 to the floor of the vehicle, and are secured to the posts 21 and 24 by means of nails or screws. The upper edges of these panels 33 and 34 are also secured to the sides of the cross member 31 by means of nails or screws. Similar metal panels 35 and 36 extend between the posts 25 and 28 and from the cross member 32 to the floor of the vehicle. A suitable box support 40 may be positioned on the floor of the vehicle to support the seat portion of the forward driver's seat 17. Pivotally secured to the rear of the forwardly offset portion 16, providing a bay on the rear side of the mentioned partition, is a folding passenger seat 19.

In Figs. 3 and 4 I have shown a modification in which the forward driver's seat 17 having a substantially vertical back 17A and the folding seat 18 secured to the rear side therof are adjustable longitudinally of the body. In carrying out this modification I provide an opening in the lower part of the rearwardly offset portion 15 of the partition, which opening is of sufficient size to permit the seat 17 to pass in a fore-and-aft direction therethrough. In this modification, I mount the seat 17 upon a stationary support 43 (Fig. 4) which is secured to the floor of the vehicle, and this support and the seat bottom may be equipped with any conventional adjusting mechanism which will enable the seat to be moved forwardly and rearwardly relative to the fixed support 43. I have indicated diagrammatically in Fig. 4 a conventional adjusting mechanism of the screw bar type. The seat 17 may thus be adjusted to accommodate the physical peculiarities of the different drivers. Usually an adjustment of two to three inches is sufficient for this purpose, and such a movement is permitted relative to the partition 15 by the thickness of the seat back which, including the upholstering, is ordinarily four or five inches, and sufficient to permit a rearward movement of two to three inches without carrying the forward surface of the seat back to the rear of the forward surface of the partition 15.

My device is cheap and simple to manufacture and install. It is particularly useful in converting the conventional five passenger closed bodies into taxicabs or limousines, and saves the construction of a special body to serve these purposes. All that is necesssary is to remove the conventional front seat and to install my structure as a unit.

Formal changes may be made in the specific embodiment of the invention described without departing from the spirit or substance of the broad invention, the scope of which is commensurate with the appended claims.

What I claim is:

1. A vehicle body comprising a rear passenger compartment, a forward operator's compartment, a staggered partition separating said compartments, the rearmost staggered portion having an opening in the lower portion thereof, an operator's seat positioned in said opening, means for moving said seat forwardly and rearwardly relative to said opening, a passenger seat carried on the rear of said operator's seat, and a passenger seat supported on the rear side of the foremost staggered portion of the partition.

2. A vehicle body comprising a rear passenger compartment, a forward operator's compartment, a staggered partition separating said compartments, a rearwardly staggered portion thereof having an opening in its lower portion, an operator's seat positioned in said opening, means for moving said seat forwardly and rearwardly relatively to said opening, and a passenger seat carried on the rear of said operator's seat.

3. In combination with a motor vehicle body having a forward driver's compartment and a rearward passenger compartment, a partition extending between the two compartments, a forward seat unit comprising a substantially vertical back portion disposed on the forward side of the partition, and an opening in the lower portion of the partition through which the seat unit including the back may be slid, toward the rear passenger compartment.

4. In combination with a vehicle body having a forward seating compartment and a rearward seating compartment fore and rear doors upon each side of the body, opening respectively into the compartments, body posts disposed between the fore and rear doors, a seat unit disposed entirely within the body and comprising an S-like partition separating the two compartments, the partition including side panel portions which terminate adjacent the body posts and which extend in opposite directions into the vehicle body, a pair of spaced partition portions extending transversely of the body to points adjacent the longitudinal centerline of the body, and a forwardly and rearwardly extending partition portion interconnecting the adjacent edges of the partition, and a seat disposed in each of the bays defined by the portions aforesaid, the partition being so arranged that the seats leave the doorways substantially unobstructed.

5. In a closed motor vehicle body having front and rear passenger sections, and side door openings giving access to said respective sections, body posts dividing said door openings, a partition extending transversely of said body and dividing said sections comprising a forwardly and rearwardly staggered wall extending between said body posts, and an adjustable driver's seat associated with the forward side of said rearwardly staggered portion of said partition and having a back adjustable with said seat transversely through said partition.

6. In a closed motor vehicle body having front and rear passenger sections and front and rear side door openings giving access to said respective sections, a transverse partition separating said sections and extending between said front and rear side door openings, and an adjustable seat in said front section having a back forming a part of said partition and adjustable with said seat transversely therethrough.

7. In a closed motor vehicle body having front and rear passenger sections and front and rear side door openings giving access to said respective sections, a transverse partition separating said sections and extending between said front and rear side door openings, an adjustable seat in said front section having a back forming a part of said partition and adjustable with said seat transversely therethrough, and a seat in said rear compartment supported on said front seat back.

STARLING A. WEST.